US005756604A

United States Patent [19]

Nakaoka et al.

[11] Patent Number: 5,756,604
[45] Date of Patent: May 26, 1998

[54] PROCESS FOR PRODUCING POLYETHER, AND PROCESS FOR RECYCLING AND REUSING HERTEROPOLYACID

[75] Inventors: Hiroshi Nakaoka; Hideyuki Ishii; Masami Suganami, all of Yokohama, Japan

[73] Assignee: Hodogaya Chemical Co., Ltd., Kanagawa-ken, Japan

[21] Appl. No.: 704,928

[22] Filed: Aug. 28, 1996

[30] Foreign Application Priority Data

Aug. 31, 1995 [JP] Japan .................... 7-245074

[51] Int. Cl.$^6$ .................................. C08G 2/06
[52] U.S. Cl. ........................... 526/69; 528/410
[58] Field of Search ................... 526/69; 528/410

[56] References Cited

U.S. PATENT DOCUMENTS

| 4,677,231 | 6/1987 | Aoshima et al. ............ 508/617 |
| 5,395,959 | 3/1995 | Weyer et al. ............... 560/231 |
| 5,414,143 | 5/1995 | Weyer et al. ............... 568/617 |

FOREIGN PATENT DOCUMENTS

| 58-83028 | 5/1983 | Japan . |
| 69-159824 | 9/1984 | Japan . |
| 3-44095 | 7/1991 | Japan . |
| 61-123628 | 6/1996 | Japan . |
| 9422575 | 1/1994 | WIPO . |

OTHER PUBLICATIONS

Brotas de Carvalho et al., Rev. Port. Quim (1976), 18, pp. 108–112.

Primary Examiner—Melvyn I. Marquis
Assistant Examiner—D. Aylward
Attorney, Agent, or Firm—Cushman Darby & Cushman IP Group of Pillsbury Madison & Sutro, LLP

[57] ABSTRACT

An industrially advantageous process described below has been established wherein tetrahydrofuran and a cyclic ether copolymerizable therewith are copolymerized by the use of a very small amount of a commercially available heteropolyacid as it is untreated, the heteropolyacid of the catalyst is recovered, recycled and reused in a simple way, and a high quality polyether substantially free from catalyst contaminants is obtained. A process for producing a polyether, comprising the steps of copolymerizing tetrahydrofuran and at least one cyclic ether copolymerizable therewith by the use of an untreated heteropolyacid as a catalyst in the presence of a hydroxy compound to form a reaction liquid, contacting the resulting reaction liquid with an anion exchange resin so that the heteropolyacid contained in the reaction liquid adsorb to the anion exchange resin to remove the heteropolyacid, desorbing the removed heteropolyacid from the anion exchange resin to reuse it as the catalyst, and reusing the anion exchange resin after the desorption as it is, thus to recycle and reuse both the catalyst and the anion exchange resin.

34 Claims, No Drawings

PROCESS FOR PRODUCING POLYETHER, AND PROCESS FOR RECYCLING AND REUSING HERTEROPOLYACID

FIELD OF THE INVENTION

The present invention relates to a process for producing polyethers by copolymerizing tetrahydrofuran (hereinafter abbreviated as THF) and a cyclic ether copolymerizable therewith.

BACKGROUND OF THE INVENTION

Polyethers have been used as a polyol component of polyurethane materials used for rolls and coating materials. Previously known polymerization catalysts for polyethers include a boron trifluoride ($BF_3$) group, fuming sulfuric acids, and fluorosulfuric acids. These catalyst systems have disadvantages of requiring the disposal of fluorine or the disposal of a large amount of waste acids in the after-treatment step and of being difficult to recycle and reuse. There is also disclosed a process which uses a heteropolyacid as the polymerization catalyst. This process, however, has problems in that the heteropolyacid used must be subjected to a pretreatment to limit its hydration number (i.e., number of hydration water molecules) to 15 molecules or less per one heteropoly-anion and that, in practical production, the heteropolyacid must be used in approximately the same amount as the monomer and further it can be difficultly recovered (JP-A-61-123628). Processes have also been disclosed which polymerize cyclic ethers using heteropolyacids without pretreatment. In these processes, however, the cyclic ethers are limited to 3-membered cyclic ethers which have a high polymerization activity (JP-B-3-44095 (JP-A-59-159824)) or the acids must be used in combination with a carboxylic acid anhydride or carboxylic acid chloride as a cocatalyst (JP-A-58-83028). Thus, heteropolyacids in untreated state (usually a hydrate having 20–40 water molecules per one molecule of heteropolyacid) have been considered as having substantially no polymerization activity in the copolymerization of THF and cyclic ethers (JP-A-61-123628).

Also in the copolymerization of THF and a cyclic ether copolymerizable therewith, when a heteropolyacid catalyst is used, the catalyst needs to be pretreated and, further, since the catalyst is used in a large amount, the steps of washing, neutralization and filtration are necessary to remove the catalyst, leading to a high production cost.

The purpose of the present invention is to provide an industrially advantageous process for obtaining a high quality polyether substantially free from catalyst contaminants which comprises copolymerizing THF and a cyclic ether by using a very small amount of an untreated heteropolyacid as it is as the catalyst, and recovering, recycling and reusing the heteropolyacid of the catalyst in a simple way.

SUMMARY OF THE INVENTION

Under such situations, the present inventors have succeeded in copolymerizing THF and a cyclic ether by using an untreated heteropolyacid in a very small amount in the presence of a hydroxy compound. Moreover, since the amount of the catalyst used is very small, the heteropolyacid of the catalyst can be easily removed by adsorption to an ion exchange resin to obtain a high quality polyether substantially free from catalyst contaminants. Furthermore, the inventors have established a technique of reusing the acid as the catalyst by recovering the catalyst adsorbed to the ion exchange resin by a conventional method of regeneration.

Thus, according to the present invention, there is provided a process for producing a polyether, comprising the steps of:

(a) copolymerizing tetrahydrofuran and at least one cyclic ether copolymerizable therewith by the use of an untreated heteropolyacid as a catalyst in the presence of a hydroxy compound to form a reaction liquid, (b) contacting the resulting reaction liquid with an anion exchange resin so that the heteropolyacid contained in the reaction liquid adsorb to the anion exchange resin to remove the heteropolyacid, (c) desorbing the removed heteropolyacid from the anion exchange resin to reuse it as the catalyst and (d) reusing the anion exchange resin after the desorption as it is, thus to recycle and reuse both the catalyst and the anion exchange resin.

According to the present invention, there is also provided a process for recovering a heteropolyacid, comprising the steps of:

(a) copolymerizing tetrahydrofuran and at least one cyclic ether copolymerizable therewith by the use of a heteropolyacid as a catalyst to form a reaction liquid, (b) contacting the resulting reaction liquid with an anion exchange resin so that the heteropolyacid contained in the react ion liquid adsorb to the anion exchange resin to remove the heteropolyacid, and (c) desorbing the removed heteropolyacid from the anion exchange resin.

According to the present invention, there is further provided a process for reusing a heteropolyacid as a catalyst in a copolymerization of tetrahydrofuran and a cyclic ether copolymerizable therewith, comprising the steps of:

(a) copolymerizing tetrahydrofuran and at least one cyclic ether copolymerizable therewith by the use of a heteropolyacid as a catalyst to form a reaction liquid, (b) contacting the resulting reaction liquid with an anion exchange resin so that the heteropolyacid contained in the reaction liquid adsorb to the anion exchange resin to remove the heteropolyacid, (c1) desorbing the removed heteropolyacid from the anion exchange resin to recover the heteropolyacid, and (c2) reusing the recovered heteropolyacid again as a catalyst in the copolymerization of tetrahydrofuran and a cyclic ether copolymerizable therewith.

DETAILED DESCRIPTION OF THE INVENTION

According to the present invention, in a mixed system comprising at least a hydroxy compound, THF and a cyclic ether, polymerization can be made to proceed at an industrially satisfactory rate merely by adding a very small amount (0.01–1.0% by weight) of an untreated heteropolyacid to the system. Moreover, the heteropolyacid needs no pretreatment as the catalyst, and common ones available on the market as 20 to 40-hydrates can be used as they are.

In the above-mentioned reaction system, when a hydroxy compound is absent, although polymerization proceeds with a trace amount of water contained in the system acting as the hydroxy compound, it yields only a polymer of very high molecular weight (for example, several ten thousands). When the cyclic ether is absent virtually no polymerization proceeds. Both cases are industrially impracticable. Of course the polymerization proceeds with a heteropolyacid which has 20 or less molecules of hydration water per one molecule of the heteropolyacid (20 or less-hydrates) in the present invention.

Since the heteropolyacid of the catalyst is used in a very small amount, it can be easily recovered with an ion exchange resin, and a polyether with little of contaminants can be obtained. By using a conventional anion exchange resin as the ion exchange resin, the heteropolyacid contained in the polyether is adsorbed to the resin and then desorbed by a conventional method to be recovered as a heteropolyacid (salt solution), which can be easily subjected to reuse after, for example, acid treatment followed by evaporation to dryness. Consequently, steps of washing, neutralization, filtration and the like are unnecessary. The ion exchange resin may be regenerated by conventional methods, and can be used until the break through point is reached. According to the present invention, therefore, the catalyst and the anion exchange resin can be recycled and reused.

The copolymerizable cyclic ethers used in the process of the present invention include ethylene oxide derivatives or oxetane derivatives. Specific examples of the ethylene oxide derivatives include ethylene oxide, propylene oxide, styrene oxide, glycidyl esters such as glycidyl acrylate and glycidyl methacrylate, and glycidyl ethers such as allyl glycidyl ether, alkyl glycidyl ethers and tetrahydrofurfuryl glycidyl ether. Specific examples of the oxetane derivatives include oxetane, 3,3-dimethyloxetane, 3-methyloxetane and 3,3-bis (chloromethyl)oxetane. These cyclic ethers may be used each alone or in a combination thereof. The amount of the cyclic ether to be used is preferably 1–200 parts by weight, more preferably 5–100 parts by weight, relative to 100 parts by weight of THF.

Examples of the hydroxy compounds used in the process of the present invention include, as compounds having one hydroxy group, water, methanol and ethanol and, as compounds having two or more hydroxy groups, ethylene glycol, 1,4-butanediol, neopentyl glycol, 1,5-pentanediol, 3-methyl-1,5-pentanediol and trimethylolpropane. Since the molecular weight of the copolymer can be controlled by the amount of the hydroxy compound used, the amount preferably varies in the range of 1–50 parts by weight, more preferably 1–10 parts by weight, relative to 100 parts by weight of the total amount of THF and cyclic ether.

The heteropolyacids used in the process of the present invention refer to heteropolyacids, which are the generic name for oxyacids formed by condensation of an oxide of at least one element selected from Mo, W and V with an oxyacid of other elements, e.g., P, Si, As, Ge, B, Ti, Ce and Co, or the salts thereof. These heteropolyacids and their salts may be, for example, heteropolyacids containing molybdenum or tungsten, more specifically, phosphomolybdic acid, phosphotungstic acid, phosphomolybdotungstic acid, phosphomolybdovanadic acid, phosphotungstovanadic acid, phosphomolybdoniobic acid, silicotungstic acid, silicomolybdic acid, silicomolybdotungstic acid, silicomolybdotungstovanadic acid, germaniumtungstic acid, borotungstic acid, boromolybdic acid, boromolybdotungstovanadic acid, boromolybdovanadic acid, boromolybdotungstovanadic acid, cobalttungstic acid, cobaltmolybdic acid, arsenotungstic acid, arsenomolybdic acid, titaniummolybidc acid, ceriummolybdic acid, and the salts of these acids. The salts are not restricted as to their kinds and include, for example, the salts of periodic table group I metals such as Li, Na, K, Rb, Cs, Cu, Ag and Au, group II metals such as Mg, Ca, Sr, Ba, Zn, Cd, and Hg, group VII metals such as Fe, Co, Ni, Ru, Pd and Pt, metals as Sn, Pb, Mn and Bi, or the ammonium salts and the amine salts.

These heteropolyacids may be used without needing any pretreatment, such as water content control. Though the untreated heteropolyacids are ordinarily marketed, at the present state of art, as 20- to 40-hydrates, the effect of the present invention can also be attained by using a heteropolyacid containing 20 or less hydration water molecules (20 or less-hydrates). The amount of the heteropolyacid to be used is preferably 0.01–1.0 part by weight, more preferably 0.2–0.5 part by weight, relative to 100 parts by weight of the total of THF and cyclic ether. When the added amount is too small the polymerization activity is undesirably low. On the other hand, even when the amount is excessively large, the polymerization activity increases no more because of the low solubility of the acid.

The hydroxy compound, THF, cyclic ether and heteropolyacid may be added in any desired order, with no particular limitation as to the order of addition.

In the present invention, the copolymerization is carried out at a reaction temperature of preferably $-10°$ to $80°$ C., more preferably $0°$ to $40°$ C. When the reaction temperature is lower than $-10°$ C. the polymerization rate is low, which is inadvantageous in industrial production. When the temperature is higher than $80°$ C., though the polymerization rate is high, the polymerization yield is low and the degradation of product quality, e.g., discoloration, occurs.

The reaction time of the copolymerization may be changed variously depending on the amount of heteropolyacid and the reaction temperature, but is preferably 1–24 hours, more preferably 1–12 hours. Even when the reaction time is increased to 24 hours or more, it does not result in the increase of polymerization yield.

Although no solvent is ordinarily used in the present copolymerization reaction, a conventional inert solvent may also be added to the reaction system. The reaction may be conducted either at atmospheric pressure or under applied pressure. The reaction may be conducted either batchwise or continuously.

The heteropolyacid of the catalyst remaining after completion of polymerization may be removed by conventional methods, such as ordinary filtration or extraction, but since the amount of the acid used is very small, it can be easily removed with an anion exchange resin. Thus, the polymerization liquid obtained, as it is or after diluted with THF, is contacted with an ion exchange resin to adsorb and remove the heteropolyacid in the polyether with the ion exchange resin. The ion exchange resin to be used is an anion exchange resin, which may be either strongly basic type or weakly basic type.

Such anion exchange resins may be, for example, those which comprise, as the basic group, amino groups, substituted amino groups, quaternary amino groups, or the like and, as the matrix, styrenic, acrylic, methacrylic or phenolic resins or various amine condensation type resins. More specifically, they may be weakly basic anion exchange resins comprising acrylic resins or styrene-divinylbenzene copolymers crosslinked with divinlybenzene as the matrix and having amino groups, or strongly basic anion exchange resins comprising such resins or copolymers as the matrix and having quaternary ammonium groups; but the anion exchange resin is not limited thereto. The treatment with the ion exchange resin may be conducted either batchwise or by the tower method. The resin can be utilized until the break through point of the total exchange capacity of the resin is reached.

The amount of the heteropolyacid which has been adsorbed when the break through point is reached is, for example, in terms of weight, about ⅓–½ of the weight of the anion exchange resin filled in an exchange tower, but the amount is not limited thereto. The treatment with the ion exchange resin may be conducted, for example, at 0°–70° C., preferably 15°–45° C., but the temperature is not limited thereto.

The ion exchange resin which has reached the break through point may be regenerated by a conventional method to recover the heteropolyacid. Thus, the ion exchange resin which has reached the break through point may be, for example, contacted with a sufficient amount of an aqueous solution of alkali, such as NaOH, to recover the heteropolyacid.

The recovered heteropolyacid may be made reusable by neutralization, followed by acid treatment and concentration.

For example, the aqueous alkaline solution of the heteropolyacid thus recovered may be contacted with a cation exchange resin and then the resin is contacted with deionized water to obtain an aqueous heteropolyacid solution, which is dried to recover the heteropolyacid.

The cation exchange resins used in the above procedure may be, for example, those comprising, as acidic groups, sulfonic groups, carboxyl groups, phenolic hydroxyl groups, or the like and, as the matrix, styrenic, acrylic, methacrylic or phenolic resins or various amine condensation type resins. More specifically, they may be strongly acidic cation exchange resins comprising styrenic resins as the matrix and having a sulfuric group, but they are not limited thereto.

The amount of the cation exchange resin used is not particularly limited so long as it is sufficient for thorough adsorption of the cations, such as $Na^+$, in the aqueous solution.

The anion exchange resin from which the heteropolyacid has been desorbed may be reused as it is, but it may also be reused after contacted with a sufficient amount of deionized water to wash off alkalis, such as NaOH, adhering to the ion exchange resin.

The molecular weight of the polyether thus obtained can be controlled by the heteropolyacid amount, hydroxy compound amount and polymerization temperature and may range about from 500 to several ten thousands. Polyethers most popularly used have a molecular weight of about 600 to 5000.

The present invention is described in more detail below, with reference to Examples, but the invention is not limited thereto.

EXAMPLES

Example 1

In a vessel equipped with a stirrer and a reflux condenser were placed 200 g of THF, 9.8 g of 1,4-butanediol and 0.56 g of a commercially available phosphotungstic acid (hydration number 25) and, while keeping the temperature of the mixture at 30° C., 80.5 g of propylene oxide was added dropwise thereto over 5 hours, to effect reaction. The reaction mixture was stirred at the same temperature for 2 hours, then diluted with 200 g of THF, 25 g of a weakly basic anion exchange resin (Amberlite, a trade name, mfd. by Organo K.K.) was added thereto, and the resulting mixture was stirred at room temperature for 2 hours. Thereafter, the resin was separated by filtration, and the filtrate was treated in a rotary evaporator to recover unreacted THF and to obtain 242 g of a transparent viscous polymer. The polymer thus obtained had a number average molecular weight of 1934 as calculated from its hydroxyl value.

Example 2

The same procedures as in Example 1 were repeated except that 100 g of THF, 4.7 g of 1,4-butanediol, 0.28 g of phosphotungstic acid and 40.3 g of propylene oxide were used, the dropwise addition was conducted at 10° C. over 5 hours and the stirring of the reaction mixture was conducted at 10° C. for 3 hours. Thus, 81 g of a polymer was obtained, which had a number average molecular weight of 972.

Example 3

The same procedures as in Example 1 were repeated except that 0.56 g of a commercially available silicotungstic acid (hydration number 26) was used in place of the phosphotungstic acid. As the result, 179 g of a polymer was obtained, which had a number average molecular weight of 1845.

Example 4

The same procedures as in Example 1 were repeated except that 100 g of THF, 4.7 g of 1,4-butanediol, 0.28 g of a commercially available phosphomolybdic acid (hydration number 25) in place of the phosphotungstic acid and 40.3 g of propylene oxide were used, and the dropwise addition and the stirring of the reaction mixture were conducted at 20° C. Resultantly 65 g of a polymer was obtained, which had a number average molecular weight of 1038.

Example 5

The same procedures as in Example 1 were repeated except that 100 g of THF, 1.22 g of water in place of the 1,4-butanediol, 0.28 g of phosphotungstic acid and 40.3 g of propylene oxide were used, the dropwise addition was conducted at 30° C. over 5 hours, and the stirring of the reaction mixture was conducted at 30° C. for 2 hours, to obtain 114 g of a polymer, which had a number average molecular weight of 1804.

Example 6

The same procedures as in Example 5 were repeated except that 4.0 g of methanol was used in place of the water, to obtain 115 g of a polymer, which had a number average molecular weight of 893.

Example 7

The same procedures as in Example 1 were repeated except that 50 g of THF, 1.5 g of 1,4-butanediol and 0.3 g of phosphotungstic acid was mixed and kept at 40° C., 11.9 g of 3,3-dimethyloxetane, in place of the propylene oxide, was added dropwise thereto over 1 hour, and the resulting reaction mixture was stirred at the same temperature for 3 hours. Resultantly 27.1 g of a polymer was obtained, which had a number average molecular weight of 1174.

Example 8

The reaction mixture liquid obtained by reaction and subsequent THF dilution each conducted in the same manner as in Example 1 was passed at a flow rate of 25 ml/hr through an exchange tower filled with 50 ml of a weakly basic anion exchange resin. On determining the pH at the outlet of the exchange tower, the pH, which had been 7.0 or more, was found to drop sharply down to 2.3 at the point of time where 5.7 kg of the diluted liquid had been ion-exchanged. The passage of the liquid was stopped at the point of time. The whole of the ion-exchanged liquid was treated in a rotary evaporator to recover unreacted THF and to obtain 3.1 kg of a transparent viscous polymer. The polymer had a number average molecular weight of 1931.

Example 9

Through about 50 ml of the weakly basic anion exchange resin, filled in the exchange tower, which had adsorbed 6.5 g of phosphotungstic acid of the polymerization catalyst used in Example 8 were passed 300 g of 3% NaOH aqueous solution and 50 g of deionized water to desorb the phosphotungstic acid, whereby a NaOH aqueous solution of phosphotungstic acid was obtained. Thereafter the ion exchange resin was regenerated by removing the NaOH adhering to the ion exchange resin with 1400 g of deionized water. Then, 350 g of the NaOH aqueous solution of the heteropolyacid obtained above and 100 g of deionized water were passed through an exchange tower filled with 50 ml of a strongly acidic cation exchange resin (Amberlite IR-118 (H), a trade name, a sulfonic acid type styrenic cation exchange resin), and the effluent was evaporated to dryness to obtain 6.0 g of a recovered phosphotungstic acid.

Example 10

A mixture of 100 g of THF, 4.9 of 1,4-butanediol and 0.28 g of the recovered phosphotungstic acid obtained in Example 9 was kept at 30° C., and 40.3 g of propylene oxide was added dropwise thereto over 5 hours to effect reaction, and the reaction mixture was stirred at the same temperature for 4 hours. Thereafter the reaction mixture was treated in the same manner as in Example 1 to obtain 90.2 g of a polymer. The polymer had a number average molecular weight of 1488.

Example 11

A mixture of 600 g of THF, 36.2 g of 1,4-butanediol and 1.68 g of phosphotungstic acid whose hydration number n had been reduced to 10 by heat treatment was kept at 30° C., and 241.5 g of propylene oxide was added dropwise thereto over 5 hours to effect reaction; the reaction mixture was stirred at the same temperature for 2 hours. Thereafter the reaction mixture was treated in the same manner as in Example 1 to obtain 810 g of a polymer. The polymer had a number average molecular weight of 2014 as calculated from its hydroxyl value.

Example 12

The anion exchange resin used in Example 11, which had adsorbed phosphotungstic acid, was treated in the same manner as in Example 9 to recover 1.55 g of phosphotungstic acid. Polymerization was conducted in the same manner as in Example 10 except for using the phosphotungstic acid recovered above, to obtain 89.5 g of a polymer. The polymer had a number average molecular weight of 1456.

Comparative Example 1

Polymerization was conducted in the same manner as in Example 1 except that 1,4-butanediol was eliminated. Only a high molecular weight polymer with an average molecular weight of about 20,000 was obtained.

Comparative Example 2

Polymerization was attempted in the same manner as in Example 1 except that propylene oxide was eliminated. The reaction did not proceed, and no polymer was obtained.

According to the present invention, THF and a cyclic ether can be copolymerized in the presence of a hydroxy compound by using as a catalyst of a very small amount of an untreated heteropolyacid as it is. Moreover, since the amount of the heteropolyacid of the catalyst used is very small, the heteropolyacid can be easily removed by adsorption with an ion exchange resin, and thereafter the intended polyether can be obtained only by removing the unreacted THF by evaporation. Thus, the process of the present invention makes it possible to synthesize polyethers having a terminal OH group by a single step of polymerization; hence the process requires no such auxiliary material as acetic anhydride and, as a matter of course, involves no such operations as hydrolysis or washing, so that it is a very simple process that does not require the disposal of waste acids and waste water. Furthermore, the ion exchange resin used can be regenerated by a conventional method, and the resin can be utilized till the break through point. The recovered heteropolyacid obtained at the time of regeneration can be made reusable by acid treatment. Thus, the process of the present invention is an excellent one which can produce high quality polyethers in a very simple way and without loss, also in industrial operation.

What is claimed is:

1. A process for producing a polyether, comprising the steps of:
   (a) copolymerizing tetrahydrofuran and at least one cyclic ether copolymerizable therewith by the use of an heteropolyacid without water content control as a catalyst in the presence of a hydroxy compound to form a reaction liquid,
   (b) contacting the resulting reaction liquid with an anion exchange resin so that the heteropolyacid contained in the reaction liquid adsorb to the anion exchange resin to remove the heteropolyacid,
   (c) desorbing the removed heteropolyacid from the anion exchange resin to reuse it as the catalyst and
   (d) reusing the anion exchange resin after the desorption as it is, thus to recycle and reuse both the catalyst and the anion exchange resin.

2. The process for producing a polyether according to claim 1 wherein the amount of the untreated heteropolyacid in the step (a) falls within the range of from 0.01 to 1.0% by weight relative to the whole of charged monomers.

3. The process for producing a polyether according to claim 1 wherein the cyclic ether copolymerizable with tetrahydrofuran is an ethylene oxide derivative or an oxetane derivative and the amount of the cyclic ether added falls within the range of from 5 to 100% by weight relative to the amount of the tetrahydrofuran.

4. The process for producing a polyether according to claim 1 wherein the hydroxy compound has at least one hydroxy group in the molecule and the amount thereof used falls within the range of from 1 to 50% by weight relative to the total amount of the tetrahydrofuran and the cyclic ether.

5. The process for producing a polyether according to claim 1 wherein the step (c) includes the step of (e1) acid-treating the heteropolyacid desorbed from the anion exchange resin to collect an acid-treated heteropolyacid and reusing the collected heteropolyacid, as it is, as the catalyst.

6. The process for producing a polyether according to claim 1 wherein the heteropolyacid has 20–40 molecules of hydration water per one molecule of the heteropolyacid.

7. The process for producing a polyether according to claim 1 wherein the heteropolyacid is one which contains molybdenum or tungsten.

8. The process for producing a polyether according to claim 1 wherein the heteropolyacid is selected from the group consisting of phosphomolybdic acid, phosphotungstic acid, silicomolybdic acid and silicotungstic acid.

9. The process for producing a polyether according to claim 1 wherein the anion exchange resin is a styrene-divinylbenzene copolymer or acrylic resin having amino groups, substituted amino groups or quaternary amino groups.

10. The process for producing a polyether according to claim 5 wherein the acid treating step includes the step of contacting the heteropolyacid with a strongly acidic cation exchange resin.

11. The process for producing a polyether according to claim 10 wherein the strongly acidic cation exchange resin is a styrenic, acrylic, methacrylic, phenolic or amine condensation type resin having sulfonic groups.

12. A process for recovering a heteropolyacid which comprises the combination steps of:
 (a) copolymerizing tetrahydrofuran and at least one cyclic ether which is copolymerizable therewith by the use of a heteropoly acid which has not been pretreated to control the water content thereof as a catalyst to form a reaction liquid,
 (b) contacting the resulting reaction liquid with an anion exchange resin so that the heteropolyacid contained in the reaction liquid adsorb to the anion exchange resin to remove the heteropolyacid, and
 (c) desorbing the removed heteropolyacid from the anion exchange resin.

13. The process for recovering a heteropolyacid according to claim 12 wherein the copolymerization of tetrahydrofuran and the cyclic ether copolymerizable therewith is carried out in the presence of a hydroxy compound.

14. The process for recovering a heteropolyacid according to claim 12 wherein the hydroxy compound has at least one hydroxy group in the molecule and the amount thereof used falls within the range of from 1 to 50% by weight relative to the total amount of the tetrahydrofuran and the cyclic ether.

15. The process for recovering a heteropolyacid according to claim 12 wherein the cyclic ether copolymerizable with tetrahydrofuran is an ethylene oxide derivative or an oxetane derivative and the amount of the cyclic ether added falls within the range of from 5 to 100% by weight relative to the amount of the tetrahydrofuran.

16. The process for recovering a heteropolyacid according to claim 12 further including the step, after the desorbing step (c), of (e2) acid-treating the heteropolyacid desorbed from the anion exchange resin.

17. The process for recovering a heteropolyacid according to claim 12 wherein the heteropolyacid has 20–40 molecules of hydration water per one molecule of the heteropolyacid.

18. The process for recovering a heteropolyacid according to claim 12 wherein the heteropolyacid is one which contains molybdenum or tungsten.

19. The process for recovering a heteropolyacid according to claim 12 wherein the heteropolyacid is selected from the group consisting of phosphomolybdic acid, phosphotungstic acid, silicomolybdic acid and silicotungstic acid.

20. The process for recovering a heteropolyacid according to claim 12 wherein the anion exchange resin is a styrene-divinylbenzene copolymer or acrylic resin having amino groups, substituted amino groups or quaternary amino groups.

21. The process for recovering a heteropolyacid according to claim 16 wherein the acid-treating step (e2) includes the step of contacting the heteropolyacid with a strongly acidic cation exchange resin.

22. The process for recovering a heteropolyacid according to claim 21 wherein the strongly acidic cation exchange resin is a styrenic, acrylic, methacrylic, phenolic or amine condensation type resin having sulfonic groups.

23. A process for reusing a heteropolyacid as a catalyst in a copolymerization of tetrahydrofuran and a cyclic ether copolymerizable therewith which comprises the combination steps of:
 (a) copolymerizing tetrahydrofuran and at least one cyclic ether copolymerizable therewith by the use of a heteropolyacid which has not been pretreated to control the water content thereof as a catalyst to form a reaction liquid,
 (b) contacting the resulting reaction liquid with an anion exchange resin so that the heteropolyacid contained in the reaction liquid adsorb to the anion exchange resin to remove the heteropolyacid,
 (c1) desorbing the removed heteropolyacid from the anion exchange resin to recover the heteropolyacid, and
 (c2) reusing the recovered heteropolyacid, again as a catalyst in the copolymerization of tetrahydrofuran and a cyclic ether which is copolymerizable therewith.

24. The process for reusing a heteropolyacid according to claim 23 wherein the copolymerization of tetrahydrofuran and the cyclic ether copolymerizable therewith is carried out in the presence of a hydroxy compound.

25. The process for reusing a heteropolyacid according to claim 23 wherein the hydroxy compound has at least one hydroxy group in the molecule and the amount thereof used falls within the range of from 1 to 50% by weight relative to the total amount of the tetrahydrofuran and the cyclic ether.

26. The process for reusing the heteropolyacid according to claim 23 wherein the cyclic ether copolymerizable with tetrahydrofuran is an ethylene oxide derivative or an oxetane derivative and the amount of the cyclic ether added falls within the range of from 5 to 100% by weight relative to the amount of the tetrahydrofuran.

27. The process for reusing a heteropolyacid according to claim 23 the step (c1) includes the step of (e2) acid-treating the heteropolyacid desorbed from the anion exchange resin.

28. The process for reusing a heteropolyacid according to claim 23 wherein the heteropolyacid has 20–40 molecules of hydration water per one molecule of the heteropolyacid.

29. The process for reusing a heteropolyacid according to claim 23 wherein the heteropolyacid is one which contains molybdenum or tungsten.

30. The process for reusing a heteropolyacid according to claim 23 wherein the heteropolyacid is selected from the group consisting of phosphomolybdic acid, phosphotungstic acid, silicomolybdic acid and silicotungstic acid.

31. The process for reusing a heteropolyacid according to claim 23 wherein the anion exchange resin is a styrene-divinylbenzene copolymer or acrylic resin having amino groups, substituted amino groups or quaternary amino groups.

32. The process for reusing a heteropolyacid according to claim 27 wherein the acid-treating step (e2) includes the step of contact the heteropolyacid with a strongly acidic cation exchange resin.

33. The process for reusing a heteropolyacid according to claim 32 wherein the strongly acidic cation exchange resin is s styrenic, acrylic, methacrylic, phenolic or amine condensation type resin having sulfonic groups.

34. A process for reusing a hydrated heteropolyacid as a catalyst in a copolymerization of tetrahydrofuran and a cyclic ether copolymerizable, which process consists essentially of:
 (a) copolymerizing tetrahydrofuran and at least one cyclic ether copolymerizable therewith by the use of a heteropolyacid which has not been pretreated to control the water content thereof as a catalyst to form a reaction liquid,
 (b) contacting the resulting reaction liquid with an anion exchange resin so that the heteropolyacid contained in the reaction liquid adsorb to the anion exchange resin to remove the heteropolyacid, (c1) desorbing the removed heteropolyacid from the anion exchange resin to recover the heteropolyacid, and (c2) reusing the recovered heteropolyacid as a catalyst in the copolymerization of tetrahydrofuran and a cyclic ether which is copolymerizable therewith.

* * * * *